Aug. 23, 1966  J. OPIE  3,267,874

MOUNTING YOKE FOR TRACK RAIL SWITCHES

Filed Aug. 7, 1964  2 Sheets-Sheet 1

INVENTOR.
John Opie
BY John F Brezina
His Attorney

Aug. 23, 1966  J. OPIE  3,267,874
MOUNTING YOKE FOR TRACK RAIL SWITCHES
Filed Aug. 7, 1964  2 Sheets-Sheet 2

INVENTOR.
John Opie
BY John F. Brezina
His Attorney

United States Patent Office 3,267,874
Patented August 23, 1966

3,267,874
MOUNTING YOKE FOR TRACK RAIL SWITCHES
John Opie, 64 S. Herbert Road, Riverside, Ill.
Filed Aug. 7, 1964, Ser. No. 388,095
5 Claims. (Cl. 104—103)

My invention is directed to removable mounting devices for holding switches and switch sections in overhead track rail systems or trolley systems which provide for moving various suspended goods and products to different areas, for example carcasses of beef or of other animals, from and to various areas of a factory or processing plant.

In packing houses, factories and manufacturing plants, overhead rail systems are installed so that parts of the track rails leading from different areas of a factory or plant join with one or more main tracks, usually in angular paths relative to the main tracks which lead in the direction of progress of the steps of processing or manufacturing toward the completed stages of the work and products. Such multiple over-head rail systems include suspended branch rail or track sections, and installation of manually operable mechanical switches is necessary so that workmen may move the articles or products from one section to and upon any one of a number of other track sections according to the work to be performed in separate plant areas.

Such switches usually include a lever operated mechanism which moves a section of a track out of the normal path of a given track and which moves in its place a curved section of track or rail to position the latter between the origination track and an angularly extending branch track so that the suspended loads may be selectively moved to or from any one of a number of "branch" track rails which extend into different areas of the plant.

In such switch devices, the connection and mounting of the spaced apart ends of the main track and of the branch track must be strong and rigid and held in correct spaced relation especially during installation so that selective positioning of a movable switch section will properly form a connection link and track section with either of the two tracks, for example, between the main track and the angular branch track.

It is an object of my invention to provide a removable connection yoke or arched link whose opposite ends are removable two separate track sections, for example of the main track and a section of a branch track, and which has structural features which will not obstruct the desired movements of pulley devices which roll on such tracks, and which may be removed from one switch area, after the adjacent track sections are secured in proper position relative to the overhead supports, and then be easily and quickly secured at other spaced apart areas and secured to other spaced apart track sections of two separate tracks; so that thereby the manufacture of a separate connection yoke for each track juncture area is eliminated.

It is to be noted that when a large number of branch track lines are to be installed so that they will "join" a main track or main progress track, it has been necessary to make and permanently install, at substantial expense, a separate connection yoke for each track juncture area.

The provision of my removably mountable yokes for holding such track juncture areas during installation of multiple track systems permits the same connection yokes to be used and installed repeatedly and successively as the building and installation of the track system progresses from one plant area to another.

Figure 1:
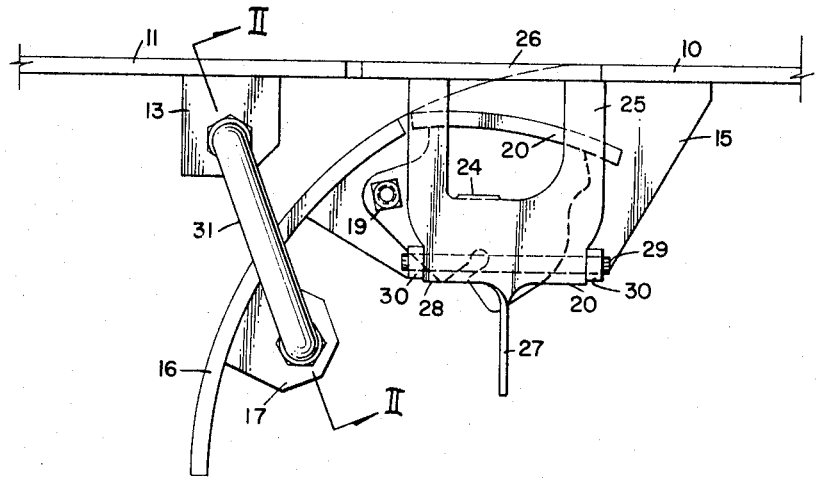
FIGURE 1 is a top plan view of an overhead track switch with spaced apart sections of the straight track at the left and right thereof, the switch being positioned between said sections and connected to a segment of an arcuate or branch track, and with the movable rail segment in aligned position with said straight track sections.

Numeral 10 designates a short section of a main, primary or straight overhead track rail which is normally connected to a suitably supported and suspended main track rail. Numeral 11 designates a straight rail segment or section which has one end, shown at the left of FIG. 1, suitably connected to the main track rail which is in alignment with track section 10. Rail section 11 has its end, adjacent the switch, recessed upwardly as indicated at 12.

Rail section 11 has a transversely extending apertured ear 13 secured thereto to provide for removable mounting of a connecting yoke hereinafter described.

Numeral 15 designates the base or mounting plate of substantially trapezoidal shape of a mechanical track switch, whose end portion is secured, preferably by welding, to track rail section 10. To the opposite end portion of mounting plate 15 is secured by welding one end portion of an arcuate track section 16 whose outer end is normally connected to a suspended branch line track which extends at varying angles relative to a straight track of which sections 10 and 11 form a part, the same extending into one or more areas of a factory or packing plant from and to which either animal carcasses or products, or containers of products are to be moved during processing and manufacturing operations.

Secured by welding to the lower portion of arcuate track section 16 is an apertured extension, lug or ear 17 to which a part of the mounting yoke is connected as hereinafter described. The inner end of arcuate track or rail section 16 is spaced apart substantially from the inner end of straight track section 10, as shown in FIGS. 1 and 3, to form a gap when shifting member 18 and track segment 20 of the switch are in retracted position.

Figure 3:
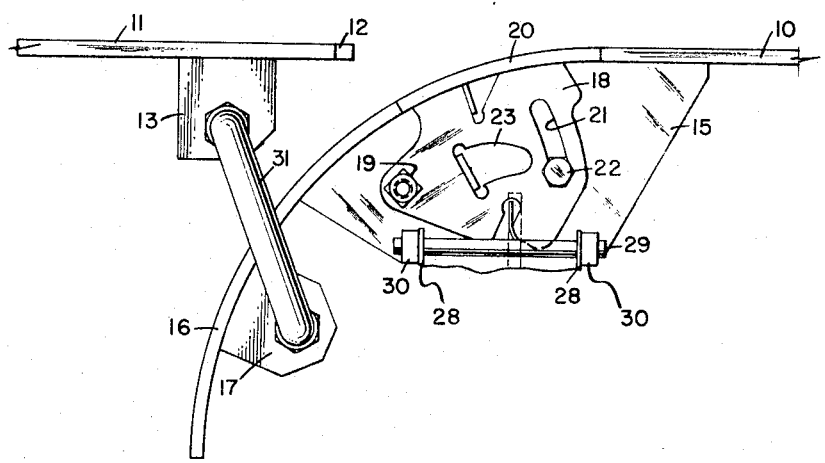
FIGURE 3 is a top plan view of said switch mechanism with an arcuate track segment moved into a position between the end of a branch track and a section of the straight track and showing the connection yoke from above.

An apertured plate-like metal shifting member 18 has one edge portion pivoted by a bolt 19 to mounting plate 15 as shown in FIG. 3, and has secured to its edge portion an arcuate track segment 20, which is of a length to fit between the inner end of track section 10 and arcuate track section 16, when the switch is moved to the position to connect the branch track and the main or straight track, as illustrated in FIG. 3.

Shifting member 18 has a slot 21 formed therein through which a screw 22 extends and which screw is threaded in a hole in mounting plate 15, thereby to limit the manually actuated movement of said shifting member 18.

Mounted on the middle portion of shifting member 18 is a beveled upwardly extending lug 23 which is slidably engaged by a depending stud or projection 24 on the middle portion of lever 25. When the lever 25 is in the lowered position shown in FIG. 1, the stud holds the shifting member 18 in the position shown in FIG. 1 in which position the arcuate rail segment 20 is retracted.

Lever 25 has its main portion bifurcated and said bifurcated ends are secured by welding to a straight track rail segment 26 which is of a length to fit between straight rail sections 10 and 11. Lever 25 has depending apertured ears 28, and a pair of spaced apart apertured posts 30 are secured to mounting plate 15. A pin 29 extends through the aligned holes of posts 30 and of ears 28 to rockably and pivotably mount or fulcrum said lever 25 above said shifting meber 18. Lever 25 has a reduced portion 27 to which a suitable cable or chain (not shown) is connected to facilitate operation of said switch.

In the installation of overhead rail and trolley systems, it is important that the respective straight tracks and branch tracks be mounted precisely so that switches of the type illustrated may be installed and connected to the previously suspended tracks or rails. To acomplish this, I provide a metal U-shaped rigid connecting yoke 31 having its depending legs suitably and removably secured to the spaced apart straight track section and to the end arcuate track section of a branch line.

Figure 2:
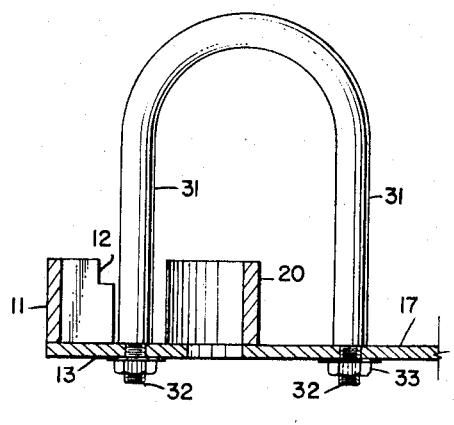
FIGURE 2 is an elevational view of a portion of the switch mechanism and a removably mounted connection yoke, connecting a segment of the branch track and the straight track and taken substantially on a line indicated by II—II of FIG. 1.

As shown in FIG. 2, the yoke 31 has reduced threaded ends 32 which are mounted to extend through the holes in ears 13 and 17 and nuts 33 are tightened thereon. Said yoke will not obstruct the travel of overhead suspension pulleys on which the load carrying means are connected.

Figure 4:
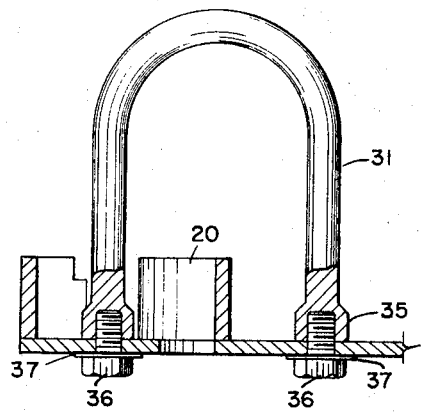
FIGURE 4 is a side elevation of my removably mounted connection yoke secured in position by a pair of threaded screws.

In FIG. 4 I illustrate a modified form of yoke 31 in which the end portions the depending legs of the yoke are enlarged as at 35 and which have internaly threaded recesses as shown. Said enlarged ends 35 have screws 36 secured therein, said screws extending through the respective holes in ears 17 and 13 respectively. Washers 37 are preferably mounted on screws 36 and which aid in holding said yoke rigidly.

Removal of said screws 36 after completion of track mounting, and mounting and connection of the rail switch permits my said yokes to be re-used in other similar rail junctions of the same track system or of other track systems in other buildings or areas.

It will be understood that once the respective track rails and rail switch are rigidly mounted and suitably and rigidly suspended, the end rail sections will remain in proper spaced position so that removal of the yoke 31 for re-use is permissible.

This removal of such yokes and remounting thereof in different locations of a track system during its installation permits a very substantial saving in the cost of such overhead track system.

While the foregoing specification sets forth the invention is specific terms, it is to be understood that numerous changes in the shape, size and materials may be resorted to without departing from the spirit and scope of the invention as claimed hereinafter, and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:
1. In combination with an overhead track system having a primary track and one or more branch tracks, said primary track and said branch track each having a mounting extension thereon; each of said extensions having an aperture therein;
a substantial U-shaped metal connecting yoke extending through said apertured extensions respectively for holding said extensions of a section of said primary track and a section of said branch track in spaced relation to each other;
means for removably mounting said yoke in connecting position including nuts threaded on the ends of said yoke to hold said branch track in spaced relation to said primary track and to facilitate mounting of said tracks in secured spaced apart stationary positions;
a mounting plate secured to said primary track;
a lever pivoted to said mounting plate and a track section mounted on said lever, said lever when actuated being adapted to position said primary track in alignment with said branch track to form a continuous track with a part of said primary track.

2. In a switching device for overhead track rails
a first primary track having two or more spaced apart rail track sections and having a branch track rail section extending angularly thereto;
said branch track rail section having its terminal portion spaced apart from the ends of said primary track rail sections;
a mounting plate connected to one of said primary track sections;
a movably mounted track segment and a lever mechanism pivoted to said mounting plate, said track segment being mounted on said lever mechanism, said lever mechanism, when moved to one position being adapted to position said track segment in alignment with said primary track rail sections, and when moved to another position being adapted to raise said track segment;
a horizontally movable shifting member pivoted to said mounting plate;
a track rail section carried on said shifting member;
said member and said track rail section being positionable between said branch rail section and one of said track sections;
a substantially U-shaped metal connecting yoke for holding portions of one of said primary track sections and of said branch track in spaced relation to each other;
and releasable means for removably mounting the opposite end portions of said yoke in connecting position to one of said first track sections and to said branch track respectively to facilitate mounting of said track sections in secured stationary positions relative to an overhead support.

3. A track rail mounting device as recited in claim 2 in which said means for removably mounting said connection yoke includes a pair of threaded screws and wherein the ends of said yoke have internally threaded recesses to receive said threaded screws respectively.

4. In a switching device for selectively connecting two or more overhead track rails, one of said track rails extending as a branch track angularly or transversely relative to the other of said rails and terminating a short distance from said other track rail, said other track rail having a gap between its spaced apart terminals;
a mounting plate connected to said other track rail;
a lever mechanism pivotally connected to said mounting plate and having a rail section thereon adapted to be selectively positioned in said gap;
a horizontally movable shifting member pivotally connected to said mounting plate, said shifting member having an arcuate track section thereon and being selectively movable into position between a terminal of said first track and a section of said branch track;
said angularly extending section of said branch track having an apertured lug thereon;
said other track rail having an apertured lug thereon;
and an arcuate connection yoke having its end portions removably connected to said apertured lugs respectively to provide for removal and remounting said yoke in different positions relative to terminals of other differently located track rail sections.

5. In a switching device for an overhead trolley system having a plurality of suspended tracks, certain of said tracks extending in paths angular to a main track;
a switching device having a mounting plate and a first track rail segment connected thereto and a second arcuate angular track rail segment connected to said mounting plate in spaced relation to said first track segment;
a manually operable lever pivoted on said mounting plate and having a straight track rail segment connected thereto;

a horizontally movable shifting member pivoted to said plate having an arcuate rail segment thereon;

said lever when actuated being adapted to selectively position said straight track rail segment into alignment with said first track rail section, said shifting member when actuated to one position being adapted to selectively position said arcuate track segment into the space between said first track section and said arcuate branch track segment; and an upwardly extending yoke having one of its lower portions removably connected to one of said straight track sections, and having its other end portion removably connected to said second arcuate track rail segment, whereby said yoke will removably hold a section of said straight track in aligned position relative to said switching device and will hold said arcuate track rail segment in rigid position spaced from said straight track.

References Cited by the Examiner
UNITED STATES PATENTS

| | | | |
|---|---|---|---|
| 1,072,409 | 9/1913 | Wright et al. | 104—101 |
| 1,390,981 | 9/1921 | Butler | 105—154 |
| 1,768,911 | 7/1930 | Koster et al. | 104—111 XR |
| 2,517,326 | 8/1950 | LeFiell | 104—101 |

ARTHUR L. LA POINT, *Primary Examiner.*

F. W. MONAGHAN, S. B. GREEN,
*Assistant Examiners.*